(No Model.) 3 Sheets—Sheet 1.
L. GUTMANN.
METHOD OF PRODUCING ALTERNATING ELECTRIC CURRENTS.
No. 419,663. Patented Jan. 21, 1890.
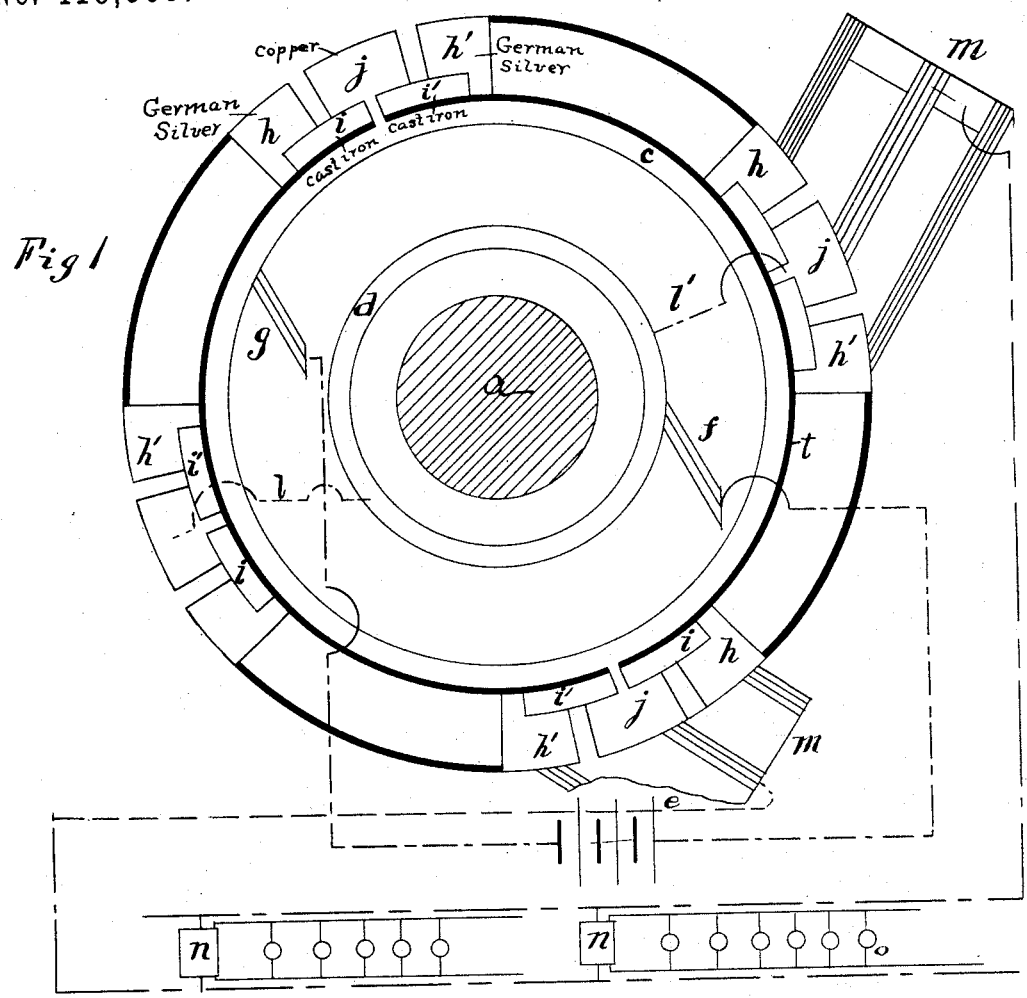
ATTEST.
B. Norman
W. Hammond
INVENTOR;
Ludwig Gutmann,
By his Attorney,
Edward P. Thompson.

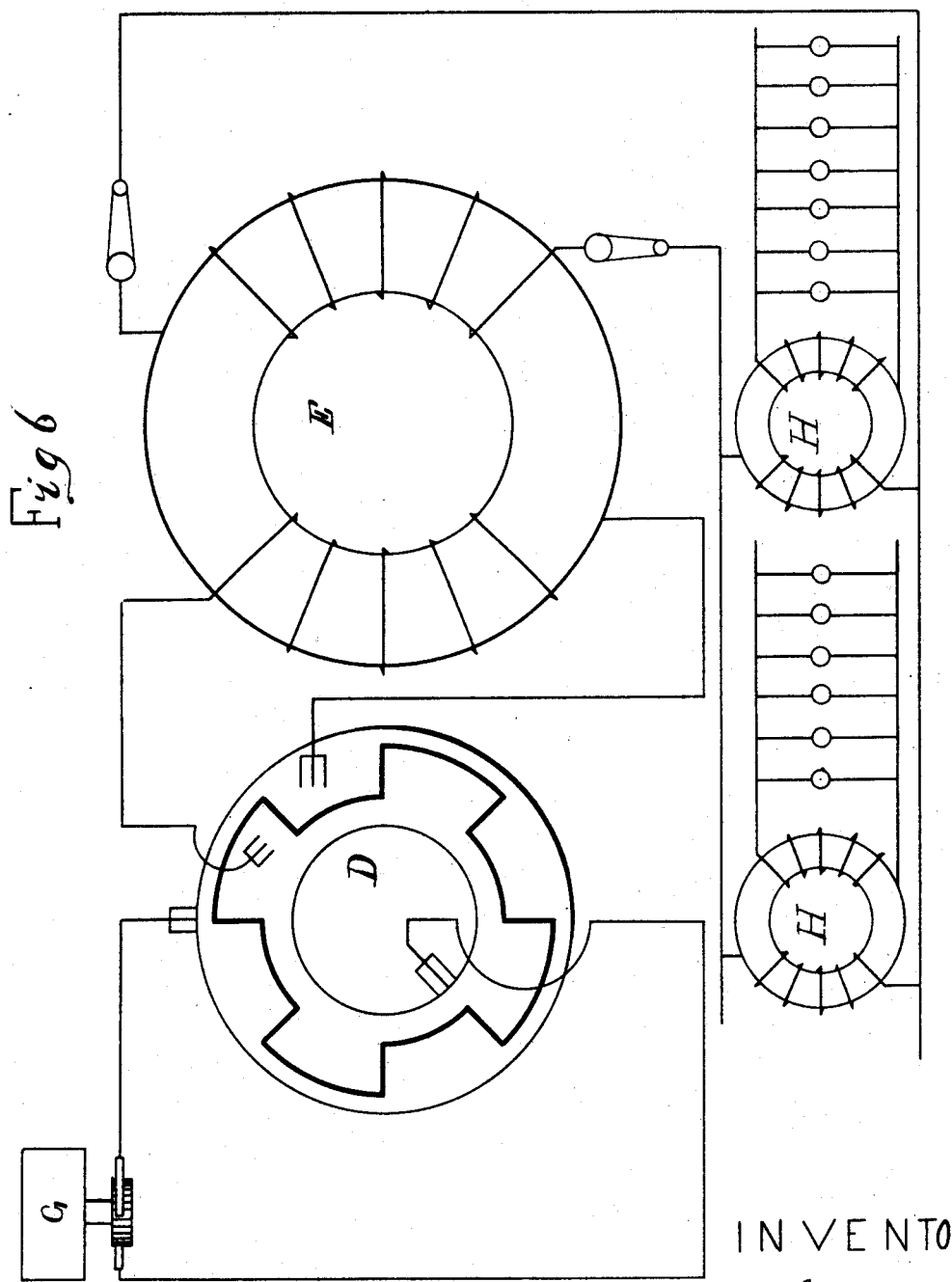

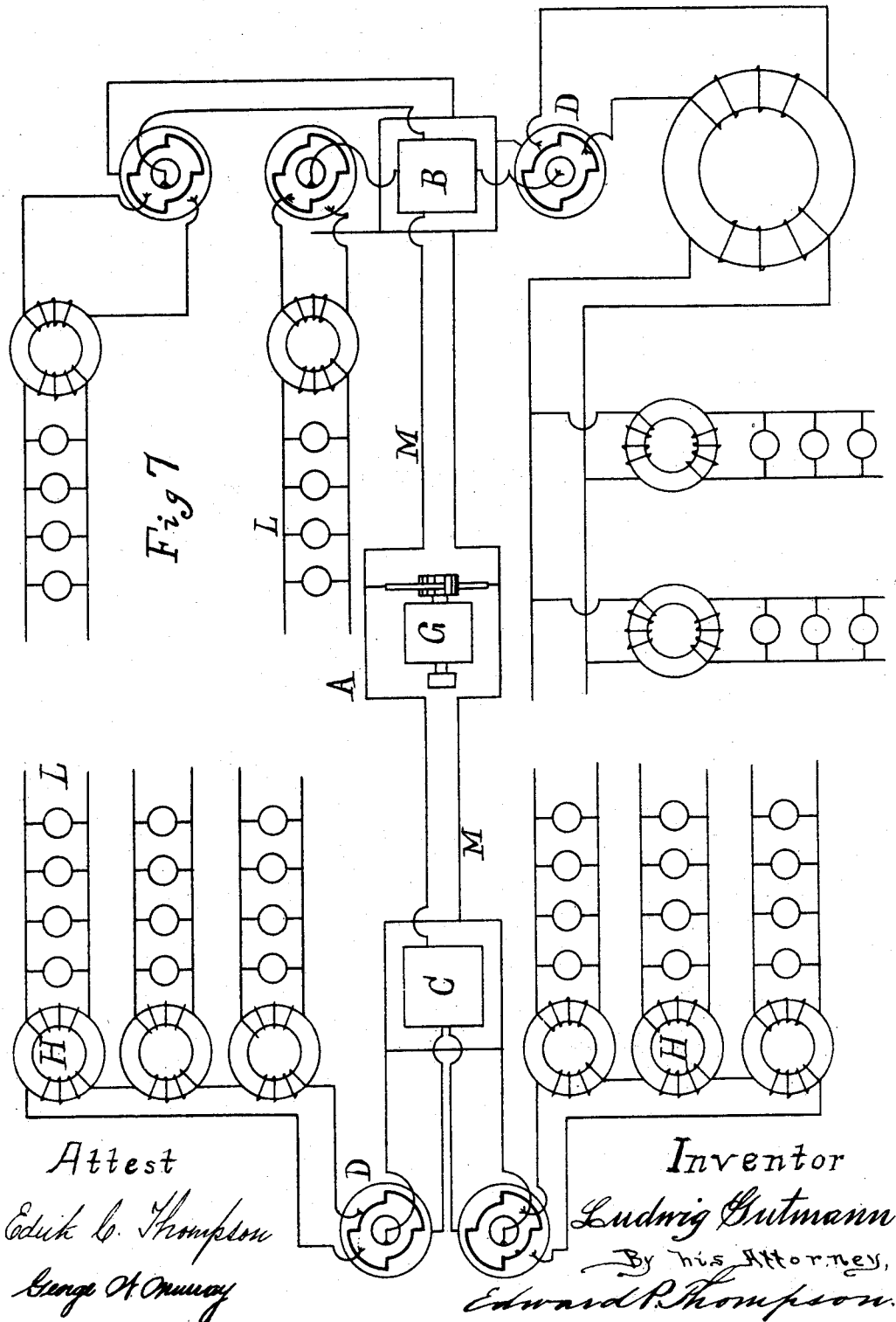

UNITED STATES PATENT OFFICE.

LUDWIG GUTMANN, OF FORT WAYNE, INDIANA.

METHOD OF PRODUCING ALTERNATING ELECTRIC CURRENTS.

SPECIFICATION forming part of Letters Patent No. 419,663, dated January 21, 1890.

Application filed November 17, 1888. Serial No. 291,145. (No model.)

*To all whom it may concern:*

Be it known that I, LUDWIG GUTMANN, a subject of the Emperor of Germany, and a resident of Fort Wayne, in the county of Allen and State of Indiana, have invented certain new and useful Improvements in Methods of Producing Alternating Electric Currents, of which the following is a specification.

My invention relates to a method for converting continuous currents such as are generated by primary or secondary batteries or by continuous-current dynamos into alternating currents similar to those which are generated by the ordinary type of alternating-current dynamo.

The invention may be carried into effect by means of a commutator, which will automatically change a continuous current into an alternating current of which each element or alteration consists of a current which increases gradually from zero to maximum and then diminishes from maximum to zero. I find that such a commutator prevents sparking at each break, the efficiency is higher than with a commutator which merely produces alternations, and that the current obtained may be employed with converters, and may be put to all the uses for which the alternating current of any alternating dynamo is employed commercially and scientifically. The construction of such a commutator, location of circuits, and mode of operation are exhibited in the following drawings, in which—

Figure 1 is a view in elevation of the commutator and brushes and electric circuits and connections, the shaft of the commutator being shown in section, and in which Figs. 2, 3, 4, and 5 show different relative positions of the brush and the commutator-plates. Figs. 6 and 7 show the applications of the commutator in different work-circuits.

The system, including the commutator, circuits, and electrical connections, consists in detail of the combination of a shaft $a$; two rings of conducting material mounted thereon and lettered $c$ and $d$, respectively; a continuous-current generator $e$, whose terminals are respectively connected to the said rings by means of a brush $f$, touching the ring $d$, and the brush $g$ in contact with the ring $c$, and four compound commutator-plates, each consisting of the following elements in the order named: a conducting-plate $h$, of comparatively high resistance, such as German silver; a conducting-plate of carbon $i$ or similar substance of high resistance, such as cast-iron, (preferably cast-iron in practice,) in contact with the plate $h$; a conducting-plate $j$, of low resistance, such as copper, in contact with the said carbon-plate, but not in direct contact with the plate $h$; a second carbon plate $i'$ in contact with the plate $j$, and a second German-silver plate $h'$ in contact with the plate $i'$, the two opposite plates $j$ being in electrical contact with the ring $d$ by means of the conductors $l$ and $l'$, and the remaining opposite plates $j$ being in electrical contact with the ring $c$, and the heavy black curved lines in all the figures indicating electrical insulation, and there being provided, ninety degrees from each other, brushes $m$ in circuit with electric converters $n$ and translating devices $o$, and the shaft $a$ being adapted to rotate.

As far as the commutation or alternation of the current is concerned, the same may be explained by reference to Fig. 1, the current passing through the brush $f$, the ring $d$, the conductor $l'$, the plates $j, i, i', h$, and $h'$, one of the brushes $m$, the converters $n$, the other one of the brushes $m$, the plates $j, h, h', i, i'$, and $j$, (the current flowing in plates $h$ and $h'$ rejoining plates $j$ by way of plates $i$ and $i'$,) with which the said brush is in contact, the ring $c$, the terminal or brush $g$, the generator $o$, and then back to the point of starting—the brush $f$. When the shaft rotates ninety degrees, it may be noticed that the brushes $m$ become connected to the opposite poles of the battery to those which are shown connected in the position represented in Fig. 1.

By referring successively to Figs. 2, 3, 4, and 5, the path of the current may be followed, as the relative positions of the commutator-plates and brushes change.

It may conveniently be mentioned here that each brush $m$ has three terminals $p, q$, and $r$, separated by carbon or cast-iron plates $i''$ and $i'''$, and that the terminals $p$ and $r$ are preferably constructed of a substance of comparatively high resistance, such as German silver.

In the position shown in Fig. 2 the current passes from the ring $c$ through the carbon plate $i$, through the German-silver plate $h$, through the German-silver plate or terminal $p$, through the carbon plate $i'$ to the terminal $q$, and so on to the external circuit, the path described being indicated by the alternated fine line of dots and dashes. When the terminals $p$ first touch the plate $h$, it is apparent that on account of a great resistance introduced into the circuit the current at the start will be weak. The action above stated is in reference to one of the brushes M; but it is evident that the same takes place also in regard to the other brush, thereby doubling the resistance which is introduced upon the completion of the circuit.

When the relative position becomes as shown in Fig. 3, the path is twofold, being through plate $i$, plate $h$, terminal $q$ as to one path, and through plate $j$, terminal $p$, plate $i''''$, and terminal $q$ as to the other path. In this case the resistance is less than in the former positions. In Fig. 1 the current may pass through all the terminals $p$, $q$, and $r$, so that the resistance is minimum and practically zero. It may be easily seen from Figs. 4 and 5 that similar relative positions of brush and commutator plates occur with similar but opposite effects upon the current. The effects are that the resistance gradually increases instead of diminishing until the terminal $r$ leaves the plate $h'$. The result then of the rotation of the shaft is that a current is produced consisting of successive alternations of current and that each element of the current rises from zero to maximum and then diminishes from maximum to zero, and that these changes are not abrupt, but gradual.

It is evident to those versed in the art that the number of sections in the commutator need not be limited to four, but that they may be decreased to two or increased to as large a number as will admit of practical construction. It is evident, also, that the number of resistance-plates forming each section of the commutator may be increased or diminished. In case of converting a current of high electro-motive force into an alternating current the plates $i$ and $i'$ should be of as high resistance as it is practical to make them.

By the use of my invention it becomes convenient to employ the alternating current for the purpose of electric lighting and the direct current for propelling electric motors or charging batteries. The commutator may be located at the central station or at one or more sub-stations. By rotating the commutator with a speed so that the same number of commutator-sections pass the brushes as the generator produces alternations, it is evident that the current will be changed into a direct current by connecting the terminals of the circuit containing the alternating current to the brushes $m$.

In Figs. 6 and 7 the commutator represented in Fig. 1 is shown by the letter D.

E is a converter so wound and applied as to serve as a means of raising the electro-motive force of the current which passes through the commutator D.

G is a direct-current generator or dynamo in circuit with the commutator D.

H are converters, and L translating devices—as, for instance, incandescent electric lamps.

In Fig. 7, A is the central station; B and C, sub-stations; E, a converter larger than the others, and M the main line, connected directly with the dynamo G.

Referring to Fig. 6, the current goes, during the operation of the system, from the dynamo G through the commutator D to the primary coil of the converter E, and returns through the commutator D to the opposite brush or pole of the same generator. As E is adapted to increase the electro-motive force of the current from the dynamo, the conductors which carry the current to the converters H need not be as large as otherwise, the converters H being adapted to reduce the electro-motive force to that required by the translating devices.

Referring to Fig. 7, the direct-current dynamo G sends its current from the central station A through the main line M to the sub-stations B and C. At the station B the converters H are connected in multiple arc with the main line, commutators D being provided between the said converters and the main line, and in one case the converter E being also introduced between the converters and the main line. At station C the converters H are placed in multiple series with one another and in series with commutators D, which are connected with the main line. Converters and commutators are placed in series; but the group of converters and their respective commutators are placed in multiple arc on the circuit.

I claim as my invention—

1. The hereinbefore-described method of producing an alternating electric current, which consists in generating a continuous electric current of a given normal strength, gradually diminishing the strength to zero or approximately to zero, reversing the current, increasing the strength of the current from zero gradually to maximum or normal strength, gradually diminishing the strength from maximum to zero, again reversing the current, and so on in rapid succession.

2. The method of generating an alternating electric current, consisting in gradually increasing a continuous electric current from zero to maximum or normal, diminishing the strength of said current from maximum to zero, reversing the direction of the said current, again gradually increasing the strength of the current from zero to normal, and rapidly repeating the above-named steps in the same order.

In testimony that I claim the foregoing as my invention I have signed my name, in presence of two witnesses, this 12th day of November, 1888.

LUDWIG GUTMANN.

Witnesses:
  G. TOYH,
  W. C. RYAN.